US007822792B2

(12) United States Patent
Reusch et al.

(10) Patent No.: US 7,822,792 B2
(45) Date of Patent: Oct. 26, 2010

(54) ADMINISTRATION OF PLANNING FILE ENTRIES IN PLANNING SYSTEMS WITH CONCURRENT TRANSACTIONS

(75) Inventors: Hans-Georg Reusch, Wiesenbach (DE); Volkmar A. Soehner, Sinsheim (DE); Andreas Wiethoff, Wiesloch (DE)

(73) Assignee: SAP AG, Walldorf (DE)

( * ) Notice: Subject to any disclaimer, the term of this patent is extended or adjusted under 35 U.S.C. 154(b) by 261 days.

(21) Appl. No.: 11/640,159

(22) Filed: Dec. 15, 2006

(65) Prior Publication Data

US 2008/0147666 A1 Jun. 19, 2008

(51) Int. Cl.
*G06F 17/30* (2006.01)

(52) U.S. Cl. ......................... 707/826; 705/28
(58) Field of Classification Search ............ 707/8; 705/1, 7, 8; 718/102
See application file for complete search history.

(56) References Cited

U.S. PATENT DOCUMENTS

| | | | |
|---|---|---|---|
| 5,249,300 A * | 9/1993 | Bachman et al. | 395/800 |
| 5,732,401 A * | 3/1998 | Conway | 705/29 |
| 6,192,370 B1 | 2/2001 | Primsch | |
| 6,393,419 B1 * | 5/2002 | Novak et al. | 707/8 |
| 6,640,244 B1 | 10/2003 | Bowman-Amuah | |
| 6,640,249 B1 | 10/2003 | Bowman-Amuah | |
| 6,922,685 B2 | 7/2005 | Greene et al. | |
| 7,206,751 B2 | 4/2006 | Hack et al. | |
| 7,103,597 B2 | 9/2006 | McGoveran | |
| 7,155,434 B1 | 12/2006 | Luo et al. | |
| 7,243,074 B1 * | 7/2007 | Pennisi, Jr. | 705/8 |
| 2002/0052769 A1 | 5/2002 | Navani et al. | |
| 2002/0059096 A1 * | 5/2002 | Ikezawa et al. | 705/10 |
| 2002/0087500 A1 * | 7/2002 | Berkowitz et al. | 707/1 |
| 2002/0156663 A1 | 10/2002 | Weber et al. | |
| 2002/0165724 A1 * | 11/2002 | Blankesteijn | 705/1 |
| 2002/0188486 A1 | 12/2002 | Gil et al. | |
| 2003/0018490 A1 | 1/2003 | Magers et al. | |
| 2003/0046130 A1 | 3/2003 | Golightly et al. | |
| 2003/0227392 A1 | 12/2003 | Ebert et al. | |
| 2004/0143486 A1 * | 7/2004 | Yeow et al. | 705/10 |

(Continued)

FOREIGN PATENT DOCUMENTS

JP          9035103          2/1997

OTHER PUBLICATIONS

"Data Blocks, Extents, and Segments," Ch. 2 of Oracle Database Concepts, 10g Release 2 (10.2) (Oct. 2005) Available at http://download-west.oracle.com/docs/cd/B19306_01/server.102/b14220.pdf Last Visited: Jun. 23, 2009.*

*Primary Examiner*—Neveen Abel Jalil
*Assistant Examiner*—Daniel Kinsaul
(74) *Attorney, Agent, or Firm*—Mintz, Levin, Cohn, Ferris, Glovsky and Popeo, P.C.

(57) ABSTRACT

After a transaction modifying a planning area in a planning system is initiated, it is determined whether there are any change objects in a consistent view of the transaction that are associated with the planning area. If there is a single change object associated with the planning area, then, the logical state of such change object is read. Alternatively, if there is more than one change object for the planning area, it is determined that the planning area must be replanned. Related apparatus, systems, methods, and articles are also described.

18 Claims, 1 Drawing Sheet

U.S. PATENT DOCUMENTS

| | | |
|---|---|---|
| 2005/0044026 A1 | 2/2005 | Leistner |
| 2005/0060235 A2 | 3/2005 | Byrne |
| 2005/0080690 A1* | 4/2005 | Sauermann et al. ............ 705/29 |
| 2005/0097078 A1 | 5/2005 | Lohman et al. |
| 2005/0149372 A1 | 7/2005 | Kite et al. |
| 2005/0171827 A1 | 8/2005 | Denton et al. |
| 2005/0256787 A1* | 11/2005 | Wadawadigi et al. ........... 705/28 |
| 2005/0289188 A1 | 12/2005 | Nettleton et al. |
| 2005/0289189 A1* | 12/2005 | Nettleton et al. ............. 707/200 |
| 2006/0111931 A1 | 5/2006 | Johnson et al. |
| 2006/0143062 A1 | 6/2006 | Booss et al. |
| 2006/0149615 A1 | 7/2006 | Andrews et al. |
| 2006/0178918 A1 | 8/2006 | Mikurak |
| 2007/0005457 A1 | 1/2007 | Suvernev et al. |
| 2007/0061266 A1 | 3/2007 | Moore et al. |
| 2007/0136278 A1 | 6/2007 | Grazioli et al. |
| 2007/0156271 A1 | 7/2007 | Runde et al. |
| 2007/0174185 A1 | 7/2007 | McGoveran |

* cited by examiner

ADMINISTRATION OF PLANNING FILE ENTRIES IN PLANNING SYSTEMS WITH CONCURRENT TRANSACTIONS

TECHNICAL FIELD

The subject matter described herein relates to administering planning file entries with concurrent transactions.

BACKGROUND

In business applications such as supply chain planning it is often necessary to schedule certain planning jobs depending on previous changes of the underlying data. For example, it is necessary to recalculate a production plan and generation of purchase orders if new customer orders have been entered into the system or if existing customer orders have been modified (new quantities of ordered goods or change in requested shipment dates).

In order to reduce required recalculations, partitions can be utilized that define logical "planning areas" which can be re-planned more or less independently from each other. In most cases, a planning area may for example represent a material or product. It can be a semi-finished or finished product.

In order to reduce the recalculations, a logical "planning file entry" can be utilized for each planning area (i.e. a "net change flag") which indicates whether a re-planning of the corresponding planning area is necessary. Each relevant change in the planning area results in the planning file entry being changed to the logical state "re-planning necessary", whereas each re-planning on a planning area resets the planning file entry to a state "no re-planning necessary". Such a flag makes it easier to determine whether a re-planning or recalculation is required. For example, a flag can be presented on a user interface in order to support the planning staff and it can be used by automatically scheduled planning jobs in order to improve their performance by avoiding unnecessary calculations with time-consuming inspections of the underlying data in the planning area. A planning file entry can be useful in connection with scenarios such as a factory with a huge amount of materials. With most scenarios, during one day, only a small percentage of the whole materials are typically affected by changes. As a result, it would be inefficient to re-plan all planning areas. By using a planning file entry, the process of re-planning can be restricted to those materials which really need a recalculation.

In arrangements in which no concurrency exists and all changes and all re-planning jobs are processed in a serial fashion, administration of planning file entries is a straightforward task. However, problems arise in when changes of underlying data and planning jobs can be executed unsynchronized and concurrently in parallel transactions. Such problems include:

Parallel changes on the same planning area causing the result of a re-planning job to be "outdated". In other words, the re-planning-job may be outdated if it publishes the state "no re-planning necessary" at the end of its task because parallel changes may have occurred which have not been taken into account by the planning algorithm.

Parallel re-planning jobs operating on the same planning area can result in "outdated" entries. Such a scenario could occur as follows: Assume that the lot size for a certain material is 100 pieces and that two planners independently of each other enter a new customer order into their interactive planning application, one for the amount of 8 pieces, and the other for the amount of 13 pieces. At the same time, both planners submit a re-planning job in parallel. Due to the lot size of 100 pieces, each re-planning job creates a new purchase order for 100 pieces. As a result two new purchase orders for 100 pieces each are created although one would be enough. This scenario would not be a serious problem if it were guaranteed that the resulting logical state of the planning file entry was to indicate "re-planning necessary" thereby indicating that the planning is not accurate. Therefore, if such an alert were initiated, it would be possible to manually or automatically (during a subsequent planning job) correct this situation.

SUMMARY

In a first aspect, a transaction modifying a planning area in a planning system is initiated. Thereafter, it is determined whether there are any change objects in a consistent view of the transaction that are associated with the planning area. If there is only one change object associated with the planning area, then the logical state is read from the change object. If there is more than one change object, then it is determined that planning area must be replanned. No replanning is conducted if there are no change objects.

Before the transaction has been committed, an updated change object can be generated that identifies the current logical state (or at least the logical state of the planning area after the transaction). Pre-existing change objects can be deleted when the updated change object is created.

The logical state of the change object can be characterized by a flag. In one state, the flag indicates that the planning area in question does not require replanning. In the other state, the flag indicates that replanning is required.

In an interrelated aspect, a transaction modifying a set of data in a database (e.g., a relational database) is initiated. Thereafter, it is determined whether there are any change objects in a consistent view of the transaction that are associated with the set of data. If only a single change object is present (visible), then the logical state of the set of data is read from such change object. If multiple change objects are visible, then it is determined that the set of data must be recalculated.

In a further interrelated aspect, a first transaction modifying data in a first plurality of planning areas of a planning system is initiated. Thereafter, a change object for each of the plurality of planning areas is generated that characterizes whether the associated planning area requires replanning.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, the current techniques and systems allow for better overall performance and throughput for planning systems. In particular, the subject matter described herein provides an efficient method for updating the logical state of a planning file entry in a system with parallel transactions without synchronizing or serializing all changes on the same planning areas and one the same planning file entries and without generation of logically wrong states for the planning file entry.

DETAILED DESCRIPTION

Figure 1:
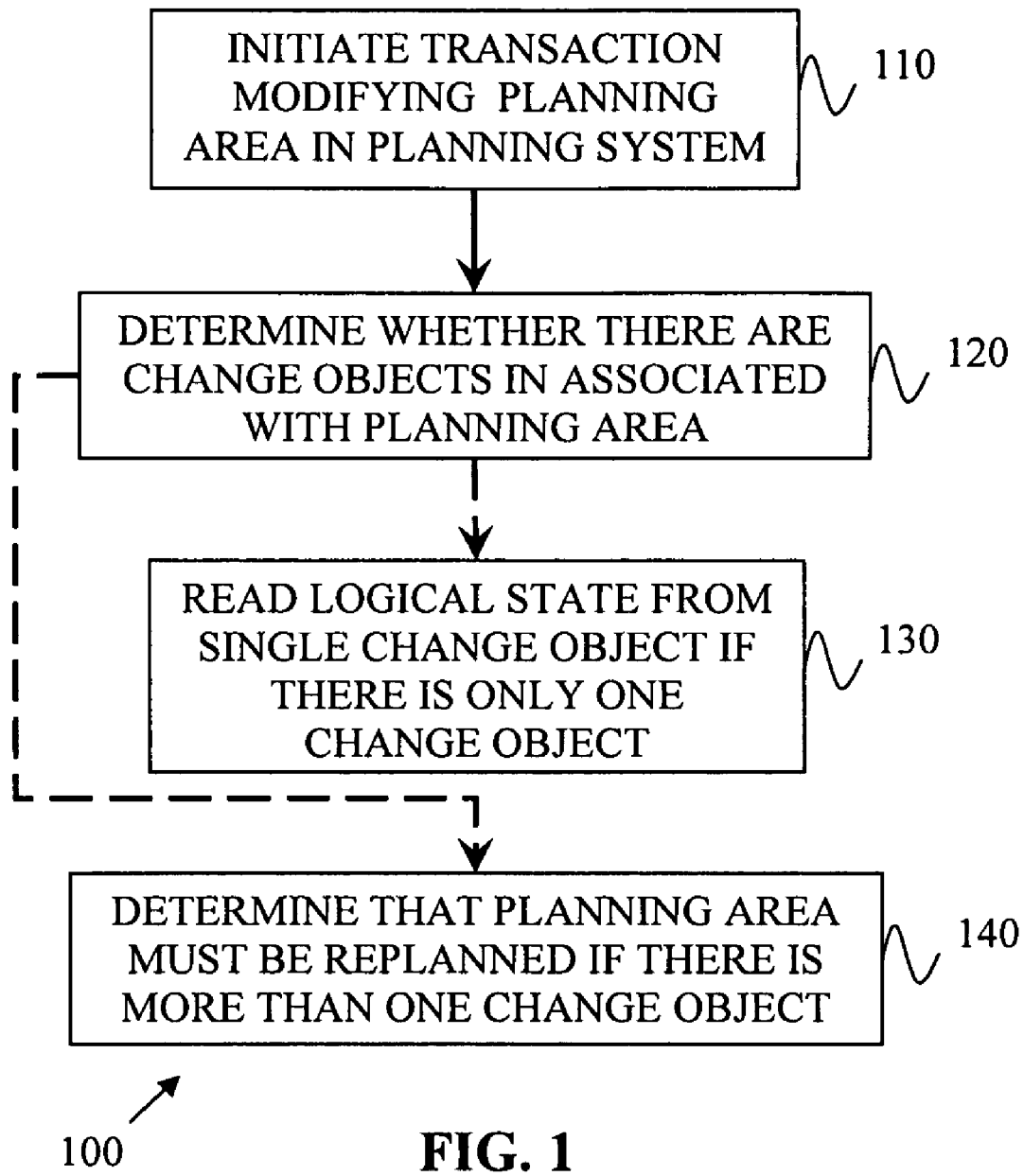
FIG. 1 is a process flow diagram illustrating a technique for administering planning file entries with concurrent transactions.

FIG. 1 is a process flow diagram illustrating a method 100 in which a transaction modifying a planning area in a planning system is, at 110, initiated. After the transaction has been initiated, it is determined, at 120, whether there are any change objects in a consistent view (whether native or at application level) of the transaction that are associated with the planning area. If there is a single change object associated with the planning area, then, at 130, the logical state of such change object is read. Alternatively, if there is more than one change object for the planning area, at 140, it is determined that the planning area must be replanned.

The subject matter described herein can be implemented in connection with a planning system designed for concurrent changes (e.g. planning jobs, interactive changes etc.). A planning system can define, for example, functions and processes that review requirements and defined parameters to suggest new operating, material and capacity plans and changes to existing plans.

A supply chain planning system can be used in connection with a database that provides a "consistent view" for accessing the data in the database. In this context, "consistent view" means that each session/transaction has a view on the underlying data which is given by the committed state of the data at the time when the current transaction has started. Even committed data changes (creation, deletion, modification) performed by parallel transactions are invisible as long as no commit or rollback (or explicit "refresh" of consistent view) has occurred in the current session. Only changes on this initial consistent view done by the transaction itself are visible within the transaction. This arrangement ensures that data is stable and consistent for the planning algorithms used in the current session. Otherwise, either concurrent changes would disturb the planning algorithm while running or it would be necessary to lock all relevant data at the beginning of the current session as explained above, leading to massive serialization. Each change of a data object requires the acquisition of an exclusive logical "lock" on the object which prevents concurrent transactions from changing the object in parallel. The set of locks held by a transaction can be released automatically at the end of transaction (commit or rollback). A lock cannot be acquired by a transaction if another parallel transaction already holds the lock (lock collision situation).

An example for such a database with consistent view as described herein is the SAP liveCache technology used by SAP in the mySAP SCM application. (see U.S. Pat. No. 6,192,370 entitled "Method and System For Rapid Memory-Resident Processing Of Transactional Data", the contents of which are hereby incorporated by reference.)

If the database used in the planning system does not support consistent view in the manner described above it is also possible to realize it on an application level, for example, by using typical client-server techniques like reading all necessary data at start of a planning transaction into a local buffer and working in this "sandbox" until the live data are updated from the buffer at the end of transaction. For purposes of the current disclosure, this arrangement is also referred to as "consistent view".

The solution presented here is applicable under the assumption that the transactions of the planning system make use of any kind of "consistent view" as described above. Whether the consistent view mechanism is provided "natively" by the underlying database or whether it is implemented on the application level (e.g. by using a special framework or a set of programming rules) does not matter.

The problem of the update and determination of the planning file entry value described above is addressed by each transaction working on a certain planning area creates a new object (or record) in the database which will be called a "change object". Generating a new change object is possible without locking problems. If a transaction modifies or recalculates data in n different planning areas then it will create n change objects. In the data part of each change object the transaction will store the state of the planning file entry for the corresponding planning area according to its own consistent view. Sample states include:

If the transaction performed "normal" changes in the planning area (no recalculation/re-planning) then a flag in the change object will be set to "re-planning necessary".

If the transaction performed a recalculation/re-planning, then a flag in the change object will be set to "no re-planning necessary".

For each planning area for which a transaction creates a change object, there may or may not already exist other change objects created by previous transactions. Due to the consistent view, these other change objects are only visible to the current transaction if the transactions in which they have been created, have been finished (committed) before the start of the current transaction. The current transaction will try to delete such "outdated" older change objects related to the same planning areas for which the transaction itself will also generate new change objects. For such outdated change objects where the lock acquisition for the deletion succeeds, the current transaction will delete these change objects.

As a result, in the case where no parallel transactions are working on the same planning area, all outdated older change objects related to this planning area are deleted and a new change object created by the current transaction is made visible. Due to consistent view, the effects of the deletions and the creation of the new change object will only be visible to other transactions starting after the commit of the current transaction which has done these changes.

In cases in which parallel transactions work on the same planning area, one or all of the outdated visible change objects may not be deleted for the current transaction because one of the concurrent transactions may already have locked them for deletion.

If a new transaction wants to determine the logical state of the planning file entry for a given planning area it can use the following algorithm:

If no change object for the planning area under consideration is visible in the consistent view of the transaction, the logical state of the planning file entry can be considered as "no re-planning necessary" because no previous change on this planning area has ever taken place.

If only one change object for the planning area is visible in the consistent view of the transaction, the logical state of the planning file entry can be read directly from the value stored in this unique change object. The correct logical value of the flag may be "no re-planning necessary" or "re-planning necessary" depending on the value stored in the change object. This determination can be made because the existence of just one visible change object for a given planning area means that the last recently committed transaction on the planning area had either no parallel overlapping competitor or only overlapping competitors which have not been committed until the start of the current transaction so that their effects are still invisible and do not need to be taken into account.

If more than one change object for the planning area is visible in the consistent view of the transaction, the last recently committed transaction on the planning area had at least one overlapping parallel "competitor". Although this competitor may have been rollbacked later in limited circumstances, a "conservative" worst case decision requires that the logical state of the planning file entry be considered as "re-planning necessary" independent of the actual values of the flags stored in the visible change objects.

From this description it should be clear that no serialization caused by the planning file entry mechanism occurs. Hence parallel updates on the same planning area are possible.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, the subject matter described herein can also be used with systems and databases in which a logical transaction consists of several phases with different consistent views. In such logical transactions the consistent view of the first phase is the phase relevant for the algorithms described above. Other embodiments may be within the scope of the following claims.

What is claimed is:

1. An article comprising a non-transitory machine-readable storage medium embodying instructions that when performed by one or more machines result in operations comprising:
    initiating a first transaction modifying data in a first plurality of planning areas of a planning system, the planning system defining functions and processes that review requirements and defined parameters to suggest new operating, material, and capacity plans and modifications thereto;
    generating a change object for each of the plurality of planning areas, each change object including a logical state identifying whether the associated planning area requires replanning, the change objects being generated before the first transaction is committed;
    initiating a second transaction modifying a second plurality of planning areas of the planning system;
    determining whether there are pre-existing change objects in a consistent view of the second transaction that are associated with each of the second plurality of planning areas, the consistent view providing that each session has a view on the underlying data given by a committed state of the underlying data at a time when a current transaction associated with the planning area has started;
    reading a logical state from a single change object if there is only one pre-existing change object associated with those planning areas in the second plurality of planning areas in order to determine whether each such planning area must be replanned; or
    determining that planning areas must be replanned if there is more one than pre-existing change object associated with such planning areas; and
    completing the second transaction.

2. An article as in claim 1, wherein the operations further comprise:
    generating an updated change object identifying a logical state of the planning area.

3. An article as in claim 2, wherein the updated change object is generated before the initiated second transaction has been committed.

4. An article as in claim 2, wherein the operations further comprise:

deleting any change objects for the planning area created prior to the consistent view of the initiated second transaction.

5. An article as in claim 2, wherein the logical state of the generated updated change object comprises a flag, and wherein a first state of the flag indicates that the planning area does not require replanning, and a second state of the flag indicates that replanning is required for the planning area.

6. An article as in claim 1, wherein the operations further comprise:
determining that replanning is not necessary if the there is no change object visible for the planning area.

7. A computer-implemented method comprising:
initiating a first transaction modifying data in a first plurality of planning areas of a planning system, the planning system defining functions and processes that review requirements and defined parameters to suggest new operating, material, and capacity plans and modifications thereto;
generating a change object for each of the plurality of planning areas, each change object including a logical state identifying whether the associated planning area requires replanning, the change objects being generated before the first transaction is committed;
initiating a second transaction modifying a second plurality of planning areas of the planning system;
determining whether there are pre-existing change objects in a consistent view of the second transaction that are associated with each of the second plurality of planning areas, the consistent view providing that each session has a view on the underlying data given by a committed state of the underlying data at a time when a current transaction associated with the planning area has started;
reading a logical state from a single change object if there is only one pre-existing change object associated with those planning areas in the second plurality of planning areas in order to determine whether each such planning area must be replanned; or
determining that planning areas must be replanned if there is more one than pre-existing change object associated with such planning areas; and
completing the second transaction.

8. A method as in claim 7, further comprising:
generating an updated change object identifying a logical state of the planning area.

9. A method as in claim 8, wherein the updated change object is generated before the initiated second transaction has been committed.

10. A method as in claim 8, further comprising:
deleting any change objects for the planning area created prior to the consistent view of the initiated second transaction.

11. A method as in claim 8, wherein the logical state of the generated updated change object comprises a flag, and wherein a first state of the flag indicates that the planning area does not require replanning, and a second state of the flag indicates that replanning is required for the planning area.

12. A method as in claim 7, further comprising:
determining that replanning is not necessary if the there is no change object visible for the planning area.

13. A computer system comprising:
a processor; and
memory coupled to the processor encoding one or more programs causing the processor to perform operations comprising:
initiating a first transaction modifying data in a first plurality of planning areas of a planning system, the planning system defining functions and processes that review requirements and defined parameters to suggest new operating, material, and capacity plans and modifications thereto;
generating a change object for each of the plurality of planning areas, each change object including a logical state identifying whether the associated planning area requires replanning, the change objects being generated before the first transaction is committed;
initiating a second transaction modifying a second plurality of planning areas of the planning system;
determining whether there are pre-existing change objects in a consistent view of the second transaction that are associated with each of the second plurality of planning areas, the consistent view providing that each session has a view on the underlying data given by a committed state of the underlying data at a time when a current transaction associated with the planning area has started;
reading a logical state from a single change object if there is only one pre-existing change object associated with those planning areas in the second plurality of planning areas in order to determine whether each such planning area must be replanned; or
determining that planning areas must be replanned if there is more one than pre-existing change object associated with such planning areas; and
completing the second transaction.

14. A system as in claim 13, wherein the operations further comprise:
generating an updated change object identifying a logical state of the planning area.

15. A system as in claim 14, wherein the updated change object is generated before the initiated second transaction has been committed.

16. A system as in claim 14, wherein the operations further comprise:
deleting any change objects for the planning area created prior to the consistent view of the initiated second transaction.

17. A system as in claim 14, wherein the logical state of the generated updated change object comprises a flag, and wherein a first state of the flag indicates that the planning area does not require replanning, and a second state of the flag indicates that replanning is required for the planning area.

18. A system as in claim 13, wherein the operations further comprise:
determining that replanning is not necessary if the there is no change object visible for the planning area.

* * * * *